United States Patent
Kao et al.

(10) Patent No.: US 7,346,283 B2
(45) Date of Patent: Mar. 18, 2008

(54) METHOD AND APPARATUS FOR CRZ-DQPSK OPTICAL SIGNAL GENERATION

(75) Inventors: Yuan-Hua Kao, Holmdel, NJ (US); Xiang Liu, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 627 days.

(21) Appl. No.: 10/881,242

(22) Filed: Jun. 30, 2004

(65) Prior Publication Data

US 2006/0008278 A1 Jan. 12, 2006

(51) Int. Cl.
*H04B 10/04* (2006.01)
*H04B 10/12* (2006.01)

(52) U.S. Cl. ...................... 398/185; 398/183

(58) Field of Classification Search ............... 398/183, 398/185

See application file for complete search history.

(56) References Cited

U.S. PATENT DOCUMENTS

| | | | |
|---|---|---|---|
| 2004/0028417 A1* | 2/2004 | Essiambre et al. | 398/188 |
| 2004/0109698 A1* | 6/2004 | Kim et al. | 398/199 |
| 2005/0180682 A1* | 8/2005 | Griffin | 385/16 |
| 2006/0245763 A1* | 11/2006 | Ishida et al. | 398/186 |

FOREIGN PATENT DOCUMENTS

WO   WO 2005/055475 A   6/2005

OTHER PUBLICATIONS

Kao et al., "10 Gb/s soliton generation for ULH transmission using a wideband GaAs pHemt amplifier", OFC 2003, Paper FF6, pp. 674-675.*

U.S. Appl. No. 10/856,729, filed May 28, 2004, Kao et al.

A. H. Gnauck, "40-Gb/s RZ-Differential Phase Shift Keyed Transmission", *Proc. OFC'03*, paper ThE1, 2003.

Y. H. Kao et al., "10Gb/s Soliton Generation For ULH Transmission Using A Wideband GaAs pHemt Amplifier", *Proc. OFC'03*, paper FF6, 2003.

T. Chikama et al., "Modulation And Demodulation Techniques In optical Heterodyne PSK Transmission Systems", *Journal of Lightwave Technology*, vol. 8, No. 3, Mar. 1990, pp. 309-322.

X. Liu, "Nonlinear Effects In Phase Shift Keyed Transmission", *Proceedings OFC'04*, Paper ThM4, 2004.

X. Liu et al., "Tolerance To In-Band Coherent Crosstalk Of Differential Phase-Shift-Keyed Signal With Balanced Detection and FEC", *IEEE Photonics Technology Letters*, vol. 16, No. 4, Apr. 2004, pp. 1209-1211.

J.-X. Cai et al., "RZ-DPSK Field Trial Over 13,100 km of Installed Non Slope-Matched Submarine Fibers", *OFC'04* post-deadlin paper PDP34 (2004).

C. Rasmussen et al., "DWDM 40G Transmission Over Trans-Pacific Distance (10,000 km) Using CSRZ-DPSK Enhanced FED And All-Raman Amplified 100 km UltraWave Fiber Spans", *Proc. OFC'03*, PD18, 2003.

(Continued)

*Primary Examiner*—Jason Chan
*Assistant Examiner*—Nathan Curs

(57) ABSTRACT

Apparatus and methods for generating chirped return-to-zero (CRZ) differential quadrature phase-shift keyed (DQPSK) optical signals using a single modulator driven by synchronous return-to-zero (RZ) drive signals to achieve simultaneous RZ pulse formatting and chirped DQPSK data modulation.

2 Claims, 13 Drawing Sheets

OTHER PUBLICATIONS

J. Leibrich et al., "CF-RZ-DPSK For Suppression Of XPM On Dispersion-Managed Long-Haul Optical WDM Transmission On Standard Single-Mode Fiber", *IEEE Photonics Technology Letters*, vol. 14, No. 2, Feb. 2002, pp. 155-157.

S. K. Korotky et al., "High-Speed, Low Power Optical Modulator With Adjustable Chirp Parameter", *Proc. of Integrated Photonics Research Topical Meeting*, Monterey, paper TuG2 (1991).

B. Bakhshi et al., "Comparison Of CRZ, RZ And NRZ Modulation Formates In A 64×12.3 Gb/s WDM Transmission Experiment Over 9000 km", *Proc. OFC'01*, paper WF4 (2001).

R.-M. Mu et al., Dynamics Of The Chirped Return-To-Zero Modulation Format, *Journal of Lightwave Technology*, vol. 20, No. 1, Jan. 2002, pp. 47-57.

J. P. Gordon et al., "Phase Noise In Photonic Communications Systems Using Linear Amplifiers", *Optics Letters*, vol. 15, No. 23, Dec. 1, 1990, pp. 1351-1353.

Y. J. Wen, "RZ/CSRZ-DPSK and Chirped NRZ Signal Generation Using A Single-Stage Dual-Electrode Mach-Zehnder Modulator", *IEEE Photonics Technology Letters*, vol. 16, No. 11, Nov. 2004, pp. 2466-2468.

* cited by examiner (b)

(a)

US 7,346,283 B2

METHOD AND APPARATUS FOR CRZ-DQPSK OPTICAL SIGNAL GENERATION

CROSS-REFERENCE TO RELATED APPLICATION

This application relates to a co-pending application entitled "Method And Apparatus For RZ-DPSK Optical Signal Generation" filed May 28, 2004.

FIELD OF THE INVENTION

The present invention relates generally to the field of optical communications, and more specifically to an apparatus and method for generating chirped return-to-zero (CRZ) differential phase-shift-keyed (DPSK) optical signals.

BACKGROUND OF THE INVENTION

The return-to-zero (RZ) pulse format for optical signals is known to offer performance advantages such as high receiver sensitivity and high immunity to inter-symbol interference as compared to non-return-to-zero (NRZ) formats. DPSK optical transmission has also been found to provide performance advantages when coupled with balanced detection, such as superior receiver sensitivity, high tolerance to some major nonlinear effects in high-speed transmissions, and high tolerance to coherent crosstalk. RZ-DPSK has accordingly become a modulation format of choice for high-capacity, long-haul transmissions.

Proposed schemes for the generation of chirp-free RZ-DPSK signals require both a Mach-Zehnder modulator (MZM) for pulse carving and another MZM for exact phase modulation. Such a format is discussed in A. H. Gnauck, "40-Gb/s RZ-differential phase shift keyed transmission," Optical Fiber Communication Conference 2003 (OFC'03), Paper ThE1 which is incorporated herein by reference.

A scheme for generating RZ on-off-keyed (RZ-OOK) signals using a single MZM and a differential amplifier has been proposed and is discussed in Y. H. Kao et al, "10 Gb/s soliton generation for ULH transmission using a wideband GaAs pHemt amplifier," OFC'03, Paper FF6, which is incorporated herein by reference. However, such a scheme cannot be used for the generation of RZ-DPSK signals because it is not capable of generating the three states, '1', '0', and '−1', in the optical field domain, of an RZ-DPSK signal.

A scheme for the introduction of chirp in RZ-OOK optical signals (i.e. CRZ-OOK signals) has been proposed in B. Bakhshi, et al, "Comparison of CRZ, RZ, and NRZ modulation formats in a 64×12.3 Gb/s WDM transmission experiment over 9000 km," in Proc. OFC'01, paper WF4, 2001, which is incorporated herein by reference. The introduction of chirp in RZ-OOK optical signals was found to provide increased resistance to nonlinear effects in long-haul 10 Gb/s transmissions. However, such a scheme requires the use of an additional phase modulator to introduce chirp into the signal, which increases the complexity and cost of the transmitter.

SUMMARY OF THE INVENTION

The present invention provides an apparatus and method for generating a CRZ-DPSK optical signals. One aspect of the invention involves the recognition that although the introduction of chirp in a DPSK signal introduces variations in the optical phase on which the DPSK signal is encoded, substantially identical chirp can be imposed on each bit while not degrading the performance of the DPSK signal. Upon differential detection, information encoded in a CRZ-DPSK signal is recovered based on the phase difference between two adjacent bits. CRZ-DPSK signals generated in accordance with the invention provide reduced self-phase-modulation (SPM), and thus reduced Gordon-Molleanauer nonlinear phase noise, particularly when suitable dispersion and power maps are applied.

In a further aspect of the invention, the inventors have discovered apparatus and methods for generating CRZ-DPSK optical signals using a single modulator driven by synchronous RZ drive signals to achieve simultaneous RZ pulse formatting and chirped DPSK data modulation.

Some of the potential advantages of CRZ-DPSK optical signal generation according to the invention include its cost-effective and compact design, lower power consumption, and lower loss than conventional RZ-DPSK transmitters using two MZMs. Further, the present invention provides better performance in terms of tolerance to modulator bandwidth limitations, particularly when the modulator is under-driven.

3

Figure 13:
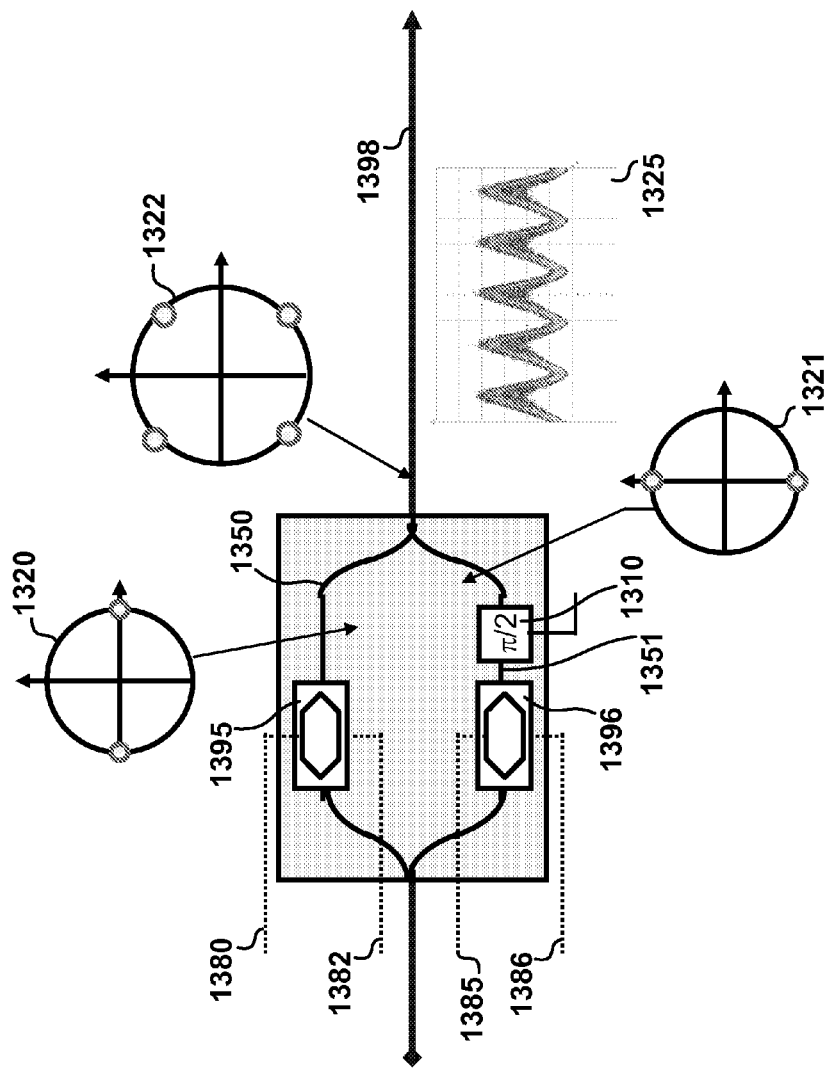

FIG. 13 is a diagram depicting an apparatus for generating CRZ-DQPSK optical signals according to another embodiment of the present invention.

DETAILED DESCRIPTION OF THE INVENTION

Figure 1:
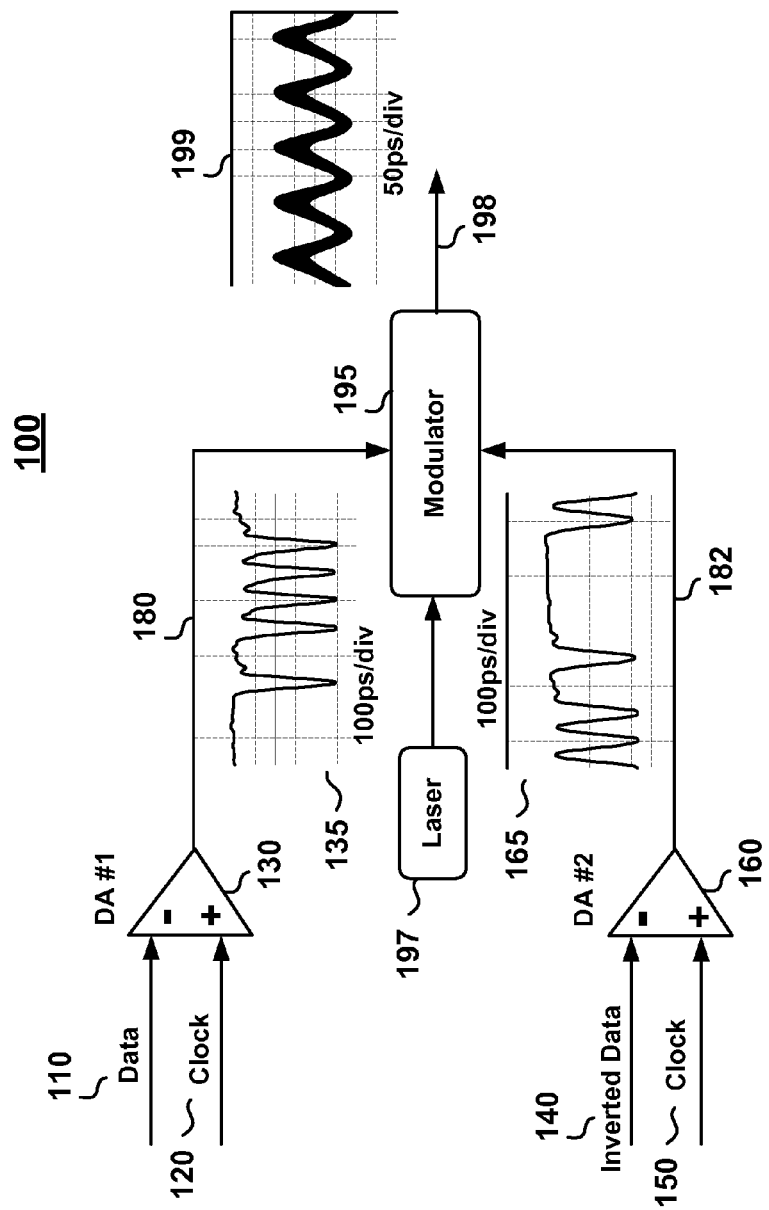
FIG. 1 is a diagram depicting an apparatus for generating CRZ-DPSK optical signals according to one embodiment of the present invention.

A CRZ-DPSK optical signal generator apparatus 100 of one embodiment of the invention is shown in FIG. 1. A data signal 110 and a sinusoidal first clock signal 120 are input into a differential amplifier (DA #1) 130. The data signal 110 contains differentially encoded data and has the same data rate as the first clock signal 120. The DA #1 130 operates as a comparator to produce a first electronic "2-level" RZ formatted drive signal 180 (referred to hereinafter as the first RZ drive signal 180 and illustrated in the inset plot 135 of FIG. 1).

Those skilled in the art can appreciate that the data signal 110 and the first clock signal 120 are logically combined (e.g. by a logic AND operation) using the DA #1 130. As used herein, a "2-level" signal refers to a signal having two distinct states (or voltages), one representing logic "1's" and the other representing logic "0's".

Referring again to FIG. 1, the inverse of the data signal 110 (inverted data signal 140) and a second clock signal 150 are input into a second differential amplifier (DA #2) 160 to generate a second electronic 2-level RZ drive signal 182 (referred to hereinafter as the second RZ drive signal 182). The DA #2 160 also operates as a comparator to produce the second RZ drive signal 182 (illustrated in the inset plot 165 of FIG. 1). A copy of the first clock signal 120 may also be used as the second clock signal 150.

Those skilled in the art can appreciate that the first and second RZ drive signals 180, 182 are "logically complementary" so as to represent the differentially encoded data contained in data signal 110 in the following manner. For each "1" in the differentially encoded data, there is a negative (or positive) electronic RZ pulse in the DA #1 130 output (i.e. the first RZ drive signal 180), and the DA #2 160 output (i.e. the second RZ drive signal 182) is zero. For each "0" in the differentially encoded data, there is a negative (or positive) electronic RZ pulse in the DA #2 160 output and the DA #1 130 output is zero.

Alternatively, the differentially encoded data contained in the data signal 110 can be represented by the first and second RZ drive signals 180, 182 as follows. For each "1" in the differentially encoded data, there is a negative (or positive) electronic RZ pulse in the DA #2 160 output, and the DA #1 130 output is zero. For each "0" in the differentially encoded data, there is a negative (or positive) electronic RZ pulse in the DA #1 130 output and the DA #2 160 output is zero.

Alternatively, DA #1 130 and DA #2 160 can be replaced by high-speed logic AND gates (not shown). Additionally, the driving speed may be scaled, for example, to 40-Gb/s.

Those skilled in the art can appreciate that retiming circuits may be employed to synchronize the signals discussed herein (e.g. the data signal 110 and the first clock signal 120; the inverted data signal 140 and the second clock signal 150; and the first RZ drive signal 180 and the second RZ drive signal 182, etc.)

The first RZ drive signal 180 and the second RZ drive signal 182 are then used to drive a modulator 195. The modulator 195 modulates light from a laser 197 to provide simultaneous RZ pulse formatting and chirped DPSK data modulation, generating a CRZ-DPSK optical signal 198. The laser 197 may comprise, for example, a tunable CW laser operating at 1550 nm, or alternatively, another optical signal or light source. The optical intensity profile of the CRZ-DPSK optical signal 198 is shown in the plot 199, inset in FIG. 1.

The modulator 195 is preferably a Mach-Zehnder modulator (MZM). More preferably, the modulator 195 is a z-cut dual drive LiNbO$_3$ MZM biased at null. It is noted that the biasing of the modulator 195 is an important aspect of the present invention. Specifically, by biasing the modulator 195 at null, proper DPSK modulation of the CRZ-DPSK signal 198 (i.e. exact phase difference of 0 or π between adjacent bits) can be realized. As understood by those skilled in the art, "biasing a modulator at null" refers to having zero output power from the modulator when the modulator drive signals are zero. A detailed discussion of operation principles of CRZ-DPSK signal generation according to the present invention is provided below.

The first and second drive signals 180, 182 may be amplified by one or more amplifiers (not shown) to have a peak-to-peak magnitude of up to about $v_\pi$ of the modulator, before driving the modulator 195. As discussed below $v_\pi$ is the voltage needed to introduce an optical phase change of π on an optical wave passing through an arm of the modulator 195.

Figure 2:
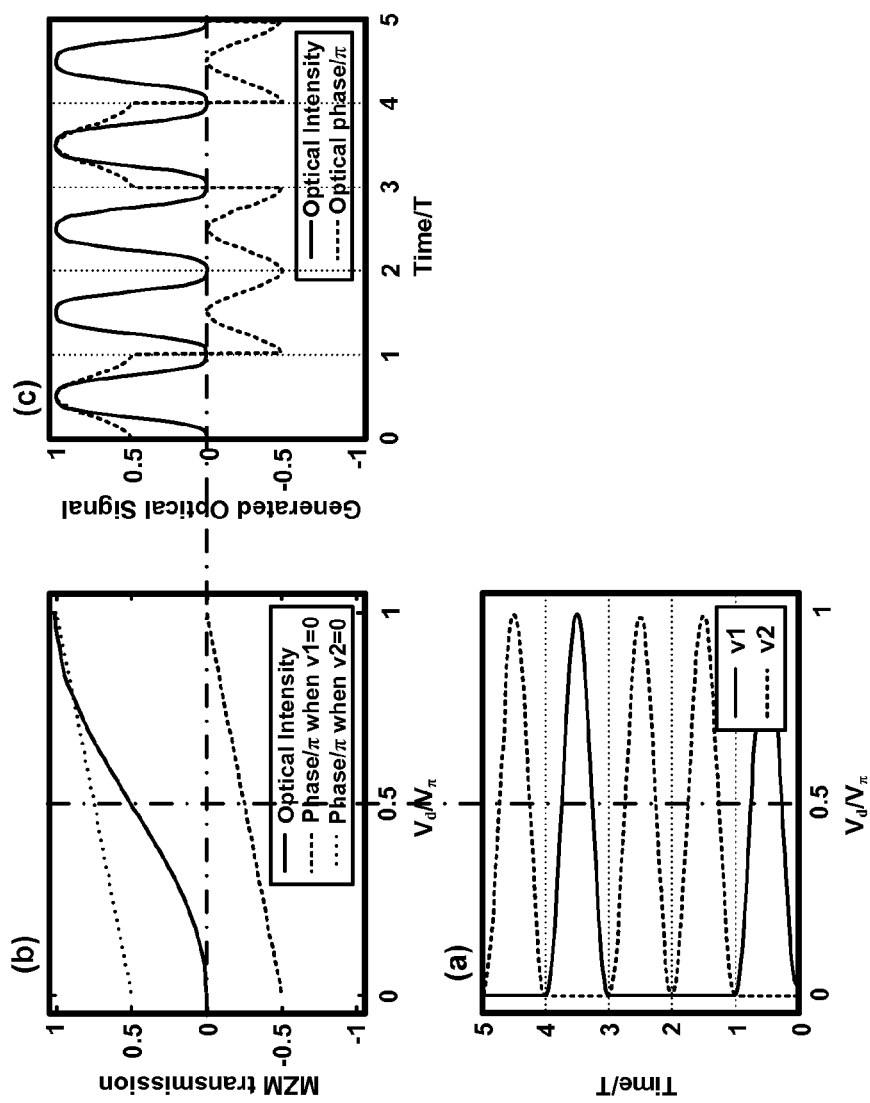
FIGS. 2 a-c are plots illustrating an operation principle of one embodiment of the present invention.

FIGS. 2 a-c illustrate an operation principle of embodiments of the invention when the modulator 195 is fully driven. Subplots (a), (b), and (c) respectively show the first and second RZ drive signals 180, 182 (labeled v1 and v2), the optical intensity and phase transfer functions of the modulator 195 (discussed in detail below), and the intensity and phase of the generated CRZ-DPSK optical signal 198.

As can be understood from the above discussion and FIGS. 2 a-c, the differentially encoded data sequence is (10010), so v1=(10010) and v2=(01101), and the generated CRZ-DPSK optical signal 198 has a phase pattern of (π00π0), excluding the identical chirp. $V_d$ is the voltage of the acting drive signal, which is the voltage of the larger one of the first and second RZ drive signals 180, 182 applied to the modulator 195.

The optical intensity and the optical phase transfer functions (shown in FIG. 2b) of the modulator 195 (biased at null) can be derived as follows. The combined optical field at the output of the modulator 195 can be expressed as $$E_{output}(t) = E_{input}(t) \cdot (e^{i\pi \cdot v1(t)/v_\pi} - e^{i\pi \cdot v2(t)/v_\pi})/2, \quad (1)$$

where v1(t) and v2(t) are the time-varying voltages of the first and second RZ drive signals 180, 182, and $v_\pi$ is the voltage needed to introduce (through the electro-optical effect) an optical phase change of π on an optical wave passing through the modulator 195 ($v_\pi$ is generally frequency dependent but is used here as a constant for simplicity).

$$v1(t)=0, \text{ whenever } v2(t)\neq 0, \text{ and } v2(t)=0, \text{ whenever } v1(t)\neq 0. \quad (2)$$

This is so because when v2≠0, the inverted data bit is "1" and the data bit is "0", and thus v1 (which is the logic AND result between a data bit and the clock whose peak is aligned with the center of the bit slot for the data bit) should be 0. The situation is inverted for the case with v1≠0. The optical field at the output of the modulator 195 can be simplified to $$E_{output}(t) = \begin{cases} E_{input}(t) \cdot (1 - e^{i\pi \cdot v2(t)/v_\pi}), & \text{when } v1(t) = 0; \\ -E_{input}(t) \cdot (1 - e^{i\pi \cdot v1(t)/v_\pi}), & \text{when } v2(t) = 0. \end{cases} \quad (3)$$

The optical intensity transfer function (after some simplifications) is then $$\left|\frac{E_{output}(t)}{E_{inpu}(t)}\right|^2 = \begin{cases} \sin^2\left(\pi\frac{v2(t)}{2\cdot v_\pi}\right); \text{ when } v1(t) = 0; \\ \sin^2\left(\pi\frac{v1(t)}{2\cdot v_\pi}\right); \text{ when } v2(t) = 0. \end{cases} \quad (4)$$

The optical phase transfer function is $$\text{phase}(t) = \begin{cases} \tan^{-1}\left(\frac{\sin(\pi\cdot v2(t)/v_\pi)}{\cos(\pi\cdot v2(t)/v_\pi)-1}\right); \text{ when } v1(t) = 0; \\ \pi + \tan^{-1}\left(\frac{\sin(\pi\cdot v1(t)/v_\pi)}{\cos(\pi\cdot v1(t)/v_\pi)-1}\right); \text{ when } v2(t) = 0. \end{cases} \quad (5)$$

Here $\tan^{-1}(\ )$ is the inverse tan ( ) function. According to the above definitions, v1=0 and v2>0 at the center of each bit slot for "1" data bits, and there is a phase variation (or chirp) across the generated optical bit. Similarly, v1>0 and v2=0 at the center of each bit slot for "0" data bits, and there is an identical phase variation (or chirp), (assuming the first and second RZ drive signals 180, 182 have identical pulse profiles) in addition to an exact phase shift of π, which is used for the DPSK data modulation. Upon differential detection of the generated CRZ-DPSK optical signal 198, the identical chirp between adjacent bits will be cancelled, and the DPSK encoded data can be recovered.

The chirp of the CRZ-DPSK optical signal 198 can be varied by adjusting the amplitude (voltage swing) of the first and second RZ drive signals 180, 182 (i.e. v1, v2). A desired phase modulation index (PMI) (i.e. the phase difference between an RZ pulse peak and pulse valley) of, for example, π/2 (or π/4) can be achieved by driving the modulator 195 with first and second RZ drive signals 180, 182 having amplitudes of about $v_\pi$ (or about $v_\pi/2$).

Figure 3:
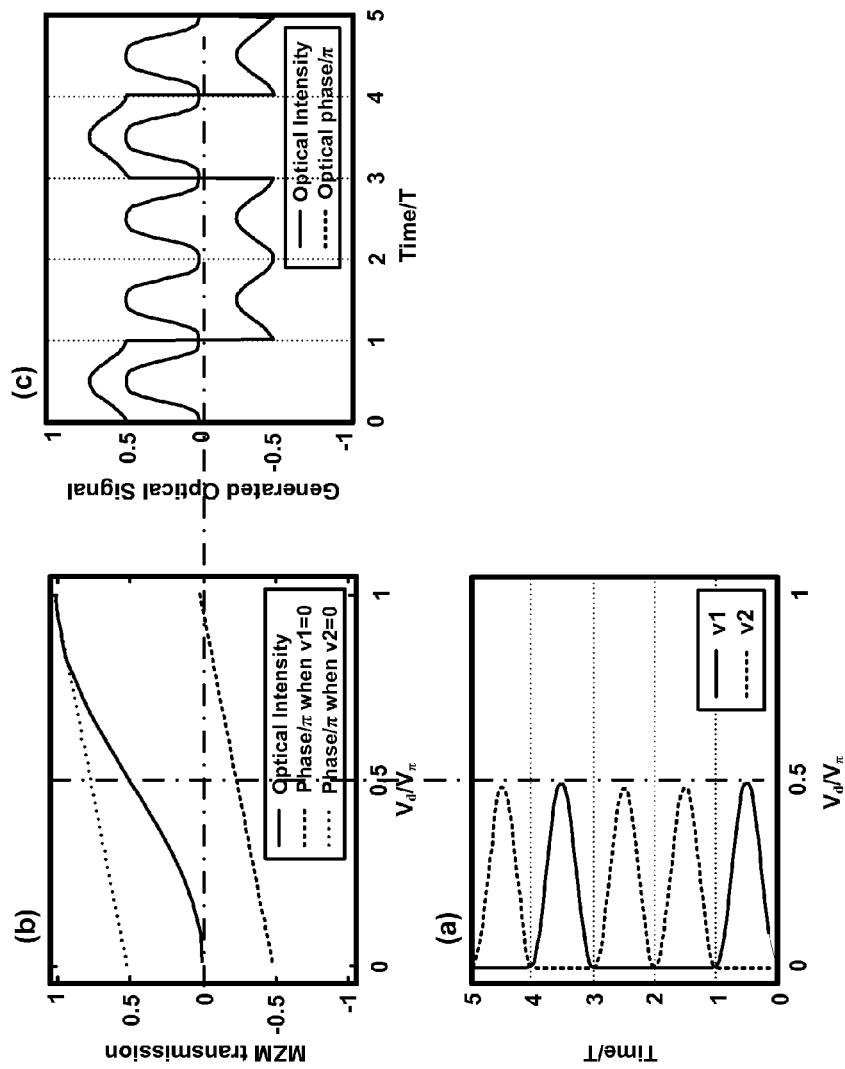
FIGS. 3 a-c are plots illustrating an operation principle of another embodiment of the present invention.

FIGS. 3 a-c illustrate an operation principle of embodiments of the invention when the modulator 195 is 50% under-driven. Subplots (a), (b), and (c) of FIG. 3 respectively show the first and second RZ drive signals 180, 182 (labeled v1 and v2), the optical intensity and phase transfer functions of the modulator 195, and the intensity and phase of the generated CRZ-DPSK optical signal 198.

As can be understood from FIGS. 3 a-c, the differentially encoded data sequence is (10010), v1=(10010), v2=(01101), and the generated CRZ-DPSK optical signal has a phase pattern of (π00π0), excluding the identical chirp. By under-driving of the modulator 195 the CRZ-DPSK optical signal 198 intensity and the chirp are reduced, as expected from Eqs. (4) and (5), however, the phase information (the DPSK encoded data) is maintained.

Experimental testing was conducted to confirm the performance of CRZ-DPSK signals generated according to embodiments of the present invention. In accordance with one embodiment of the invention (discussed above with reference to FIG. 1), a single z-cut dual drive MZM was used as the modulator 195 to generate a 10 Gb/s CRZ-DPSK optical signal 198. First an second RZ drive signals 180, 182 were applied to the modulator 195, with amplitudes of about 2.5 V and about 6 V. The amplitudes of about 2.5 V and about 6 V corresponded to PMIs of about 0.7 rad. and about 1.5 rad., respectively.

Figure 4:
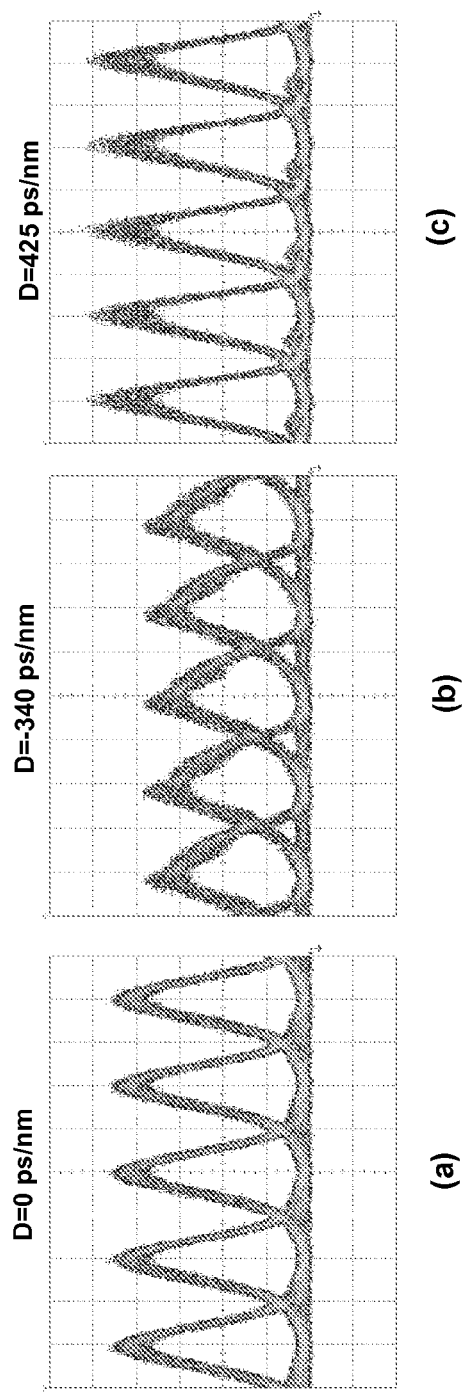
FIGS. 4 a-c are respectively the eye diagrams for CRZ-DPSK transmission under chromatic dispersions of 0 ps/nm, −340 ps/nm, and +425 ps/nm, and with a modulator which is fully driven in accordance with an embodiment of the present invention.

The CRZ-DPSK optical signal 198 was received at a receiver and filtered by an optical bandpass filter with ~0.6 nm 3-dB bandwidth before being de-modulated by a 100-ps delay-line interferometer (DLI). The de-modulated signals from the constructive and destructive ports of the DLI were then measured. FIGS. 4 a-c are, respectively, the received electrical eye diagrams (measured at the constructive port of the DLI) of CRZ-DPSK optical signals under chromatic dispersions of 0 ps/nm, −340 ps/nm, and +425 ps/nm, when the modulator 195 is substantially fully driven. Those skilled in the art will appreciate from FIGS. 4 b-c, that there is significant eye distortion due to chromatic dispersion.

Figure 5:
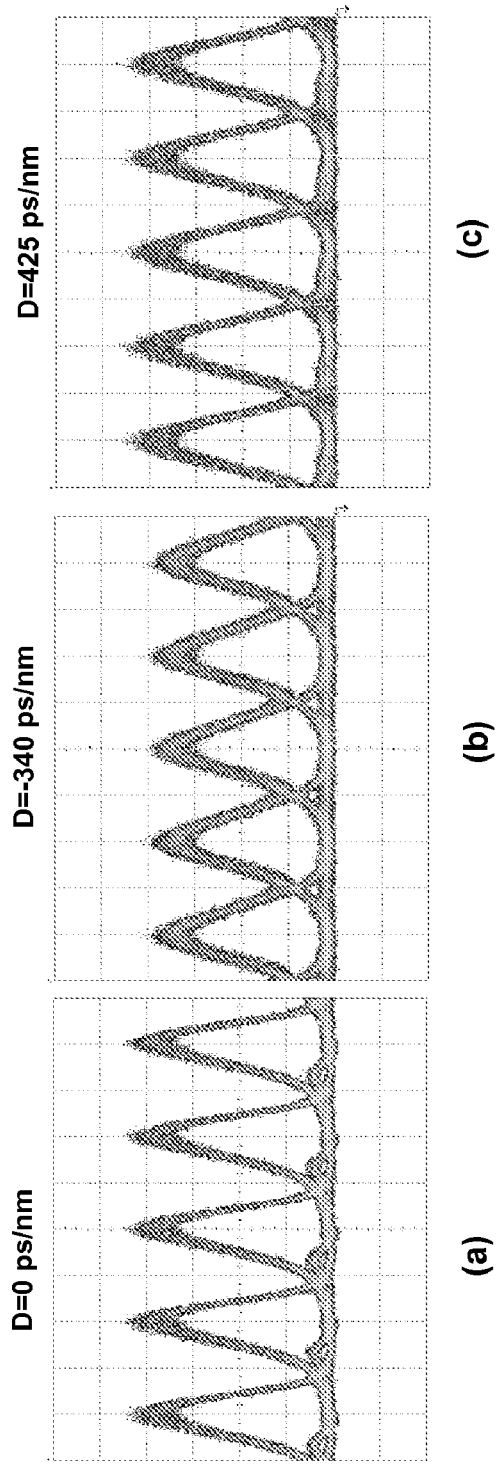
FIGS. 5 a-c are respectively the eye diagrams for CRZ-DPSK transmission under chromatic dispersions of 0 ps/nm, −340 ps/nm, and +425 ps/nm, and with a modulator which is under-driven in accordance with another embodiment of the present invention.

Experimental testing was also conducted with a modulator 195 under-driven by about 50%. FIGS. 5 a-c are, respectively, the received electrical eye diagrams of CRZ-DPSK signals (measured at the constructive port of the DLI) under chromatic dispersions of 0 ps/nm, −340 ps/nm, and +425 ps/nm. Those skilled in the art will appreciate from FIGS. 5 b-c, the eye distortion due to chromatic dispersion is reduced (as compared to the distortion shown in FIGS. 4 b-c), as a result of the reduced chirp when the modulator is under-driven.

Figure 6:
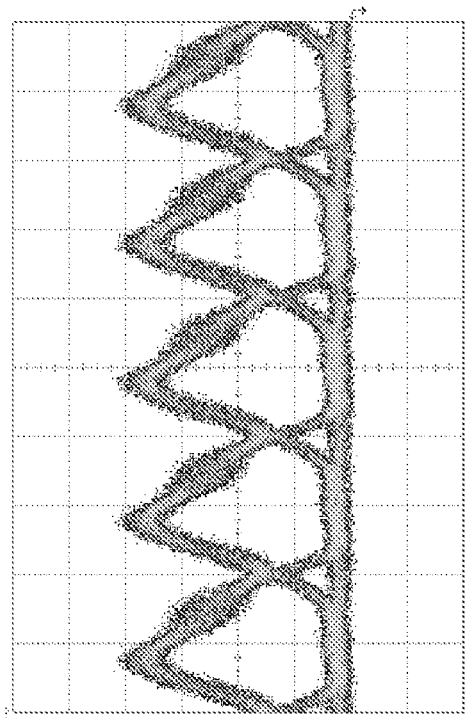
FIGS. 6 a-b are respectively the received electrical eye diagrams of back-to-back transmission of an NRZ-DPSK signal according to the prior art at constructive and destructive ports of a delay-line interferometer.
Figure 6:
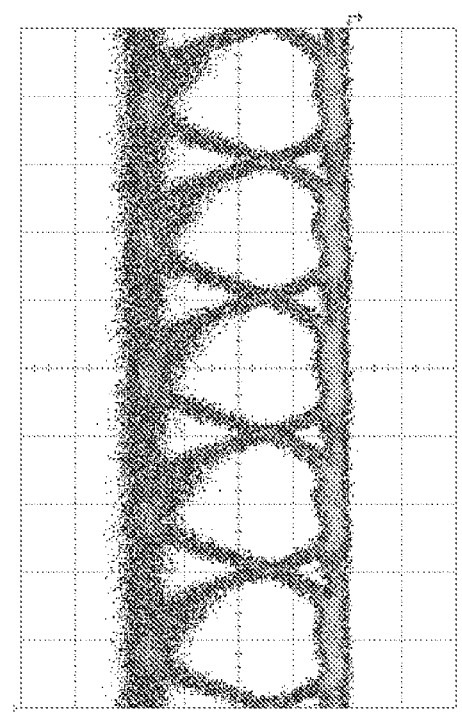

As a comparison, testing was also conducted for conventional NRZ-DPSK signals. FIGS. 6 a-b are respectively the received electrical eye diagrams of a prior art NRZ-DPSK back-to-back transmission at the constructive and destructive ports of a DLI. It can be appreciated by those skilled in the art that the eye diagrams of FIGS. 6 a-b from the NRZ-DPSK signal transmission have noticeable pattern dependence as compared to the CRZ-DPSK eye diagrams of FIGS. 4a and 5a.

Figure 7:
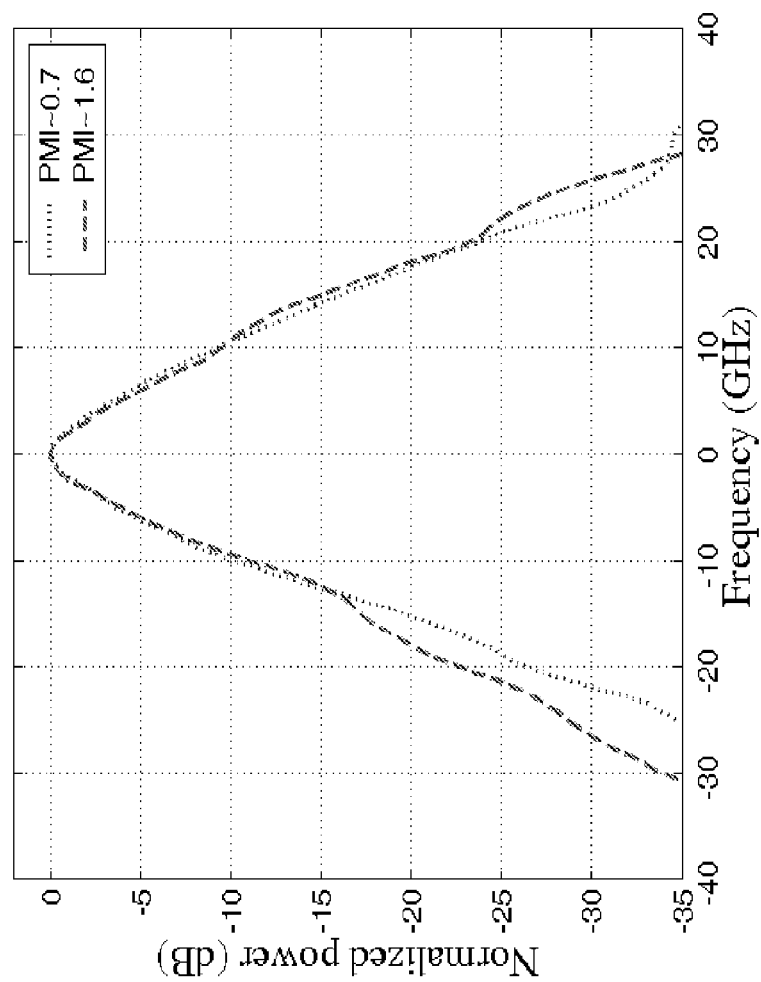
FIG. 7 is the measured optical spectra of CRZ-DPSK signals generated in accordance with embodiments of the present invention.

FIG. 7 is the measured optical spectra of a 10 Gb/s CRZ-DPSK optical signal generated with apparatus according to embodiments of the present invention. Those skilled in the art will appreciate from FIG. 7, that the measured spectra are similar to (but slightly broader than) those conventionally obtained by prior art apparatus using two modulators to generate chirp-free RZ-DPSK signals.

Figure 8:
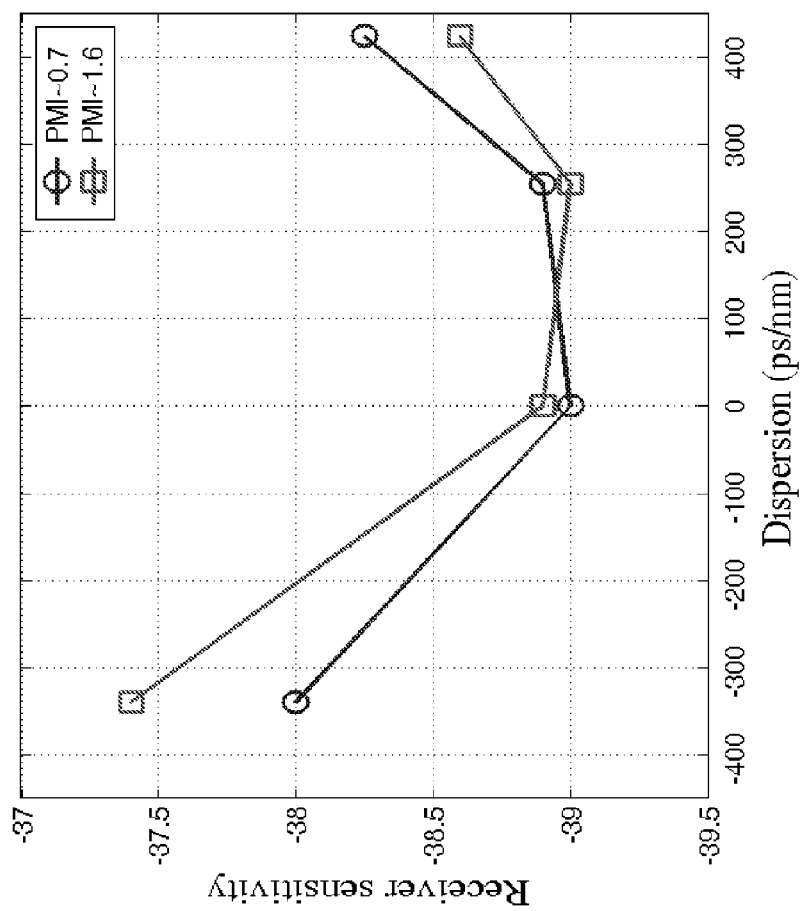
FIG. 8 is a plot showing the measured receiver sensitivities vs. dispersion of 10 Gb/s CRZ-DPSK signals generated according to embodiments of the present invention.

To further assess the performance of CRZ-DPSK optical signals generated in accordance with embodiments of the present invention receiver sensitivities vs. dispersion of 10 Gb/s CRZ-DPSK optical signals were measured. FIG. 8 shows the measured receiver sensitivities for CRZ-DPSK optical signals generated with a PMI of about 1.6 and about 0.7. As can be understood from FIG. 8, the dispersion induced penalty is more asymmetric about D=0 ps/nm for a PMI of about 1.6 than for a PMI of about 0.7, indicating that the chirp is larger for larger PMI, as expected from Eq. 5.

Figure 9:
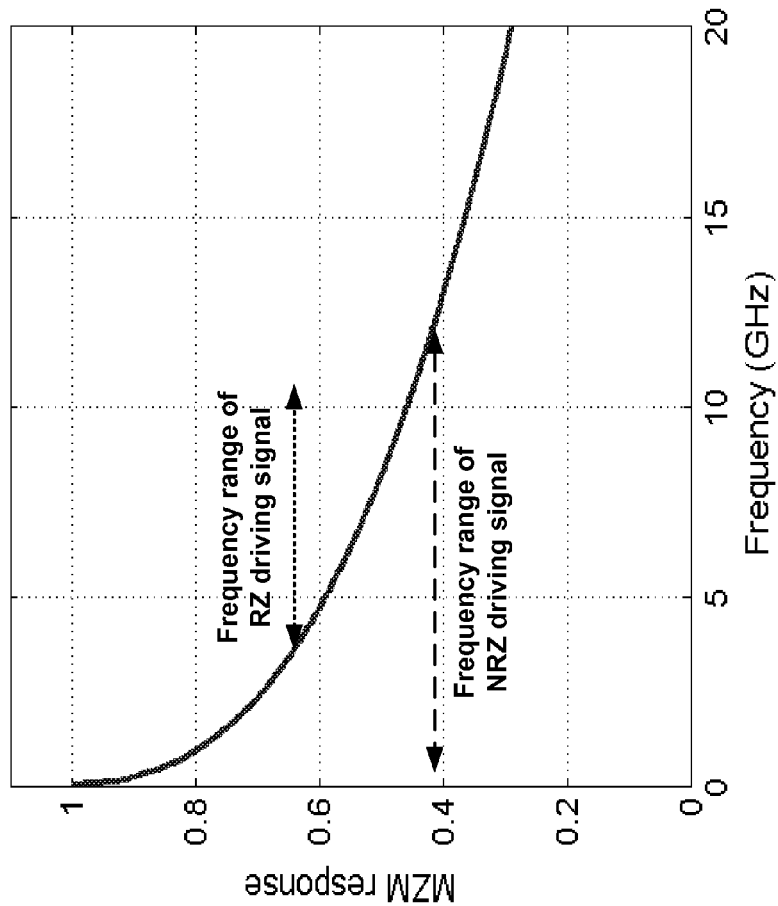
FIG. 9 is a plot showing the typical response of a 10-Gb/s MZM.

FIG. 9 shows a typical response of a 10-Gb/s MZM. As shown in FIG. 9, there is a quick response fall-off at low frequency (due to the electronic loss of the electrodes in the MZM), and a gradual response fall-off at high frequency (due to the group-velocity mismatch between the electronic driving signal and the optical wave). In conventional RZ-DPSK transmitters, one of the two MZMs is used for NRZ-DPSK modulation. Since the frequency range of the dominant portion of the RF spectrum of an NRZ driving signal spans from ~0 to BR (BR is the bit rate of the signal), the generated optical signal has large variation in amplitude (at the center of each bit slot where decision is made) due to the large frequency dependence of the MZM response.

Using embodiments of the present invention, first and second RZ drive signals 180, 182 are RZ formatted and the frequency ranges of the dominant portions of the RF spectra of the first and second RZ drive signals 180, 182 are located around the BR. Consequently, the generated CRZ-DPSK optical signal 198 has a much smaller variation in amplitude at the center of each bit slot where the decision is made, resulting in better BER performance. Additionally, modulators that can be used in accordance with the present invention can be designed to be narrow-banded to reduce the voltage of the drive signals and cost, especially at high bit rates (e.g. 40 Gb/s).

Figure 10:
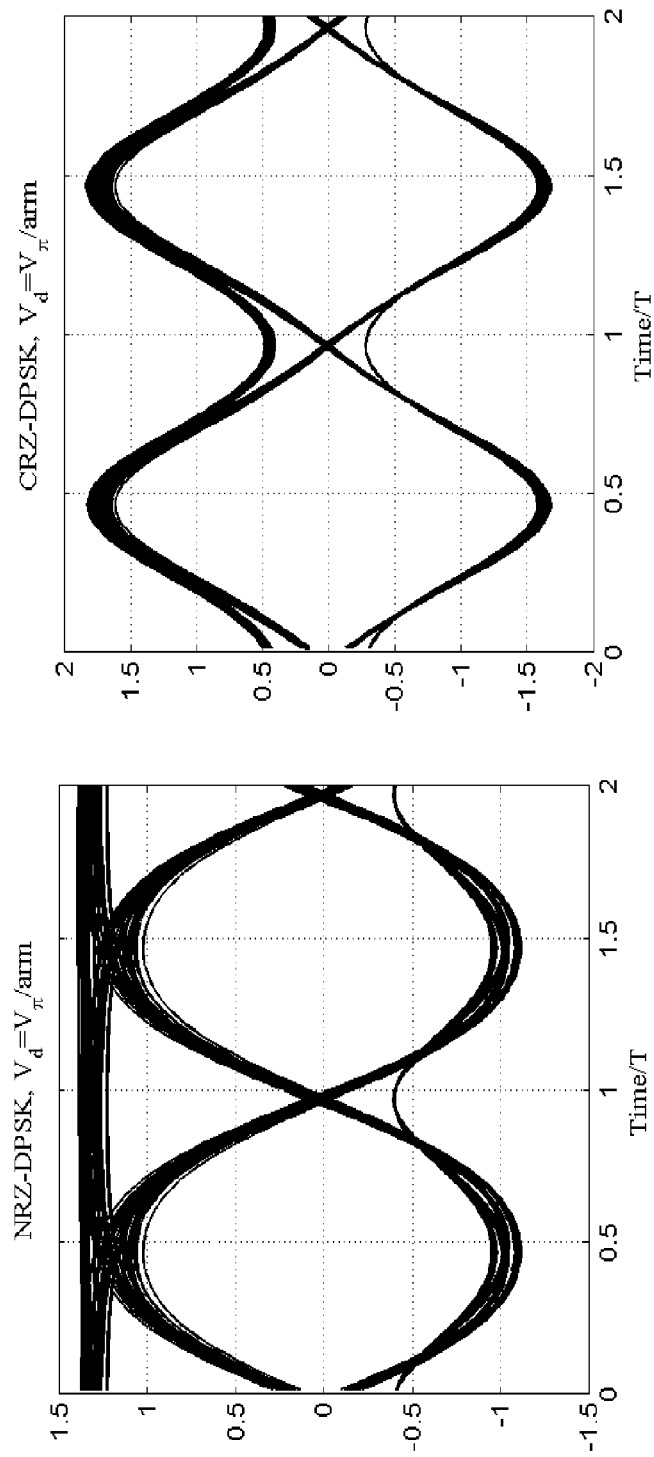
FIG. 10 is the simulated eye diagrams after balanced detection of a conventional NRZ-DPSK back-to-back transmission, and a CRZ-DPSK back-to-back transmission in accordance with an embodiment of the present invention.

FIGS. 10 a-b respectively show simulated electrical eye diagrams (after balanced detection, assuming the modulator has a limited bandwidth as shown in FIG. 9 and is fully driven ($V_d=V_\pi$/arm)), of a conventional NRZ-DPSK back-to-back transmission, and a CRZ-DPSK back-to-back transmission in accordance with an embodiment of the invention. As can be seen in FIGS. 10 a-b, the amplitude fluctuation in the NRZ-DPSK eye is much larger than that in the CRZ-DPSK eye diagram. In conventional RZ-DPSK transmitters, the RZ pulse formatting by a second MZM cannot reduce the amplitude fluctuation caused by the NRZ-DPSK modulation (while it may reduce the timing jitter of the generated signals). Accordingly, CRZ-DPSK transmitters according to the present invention also outperform (in terms of having less amplitude fluctuation) conventional RZ-DPSK transmitters.

Figure 11:
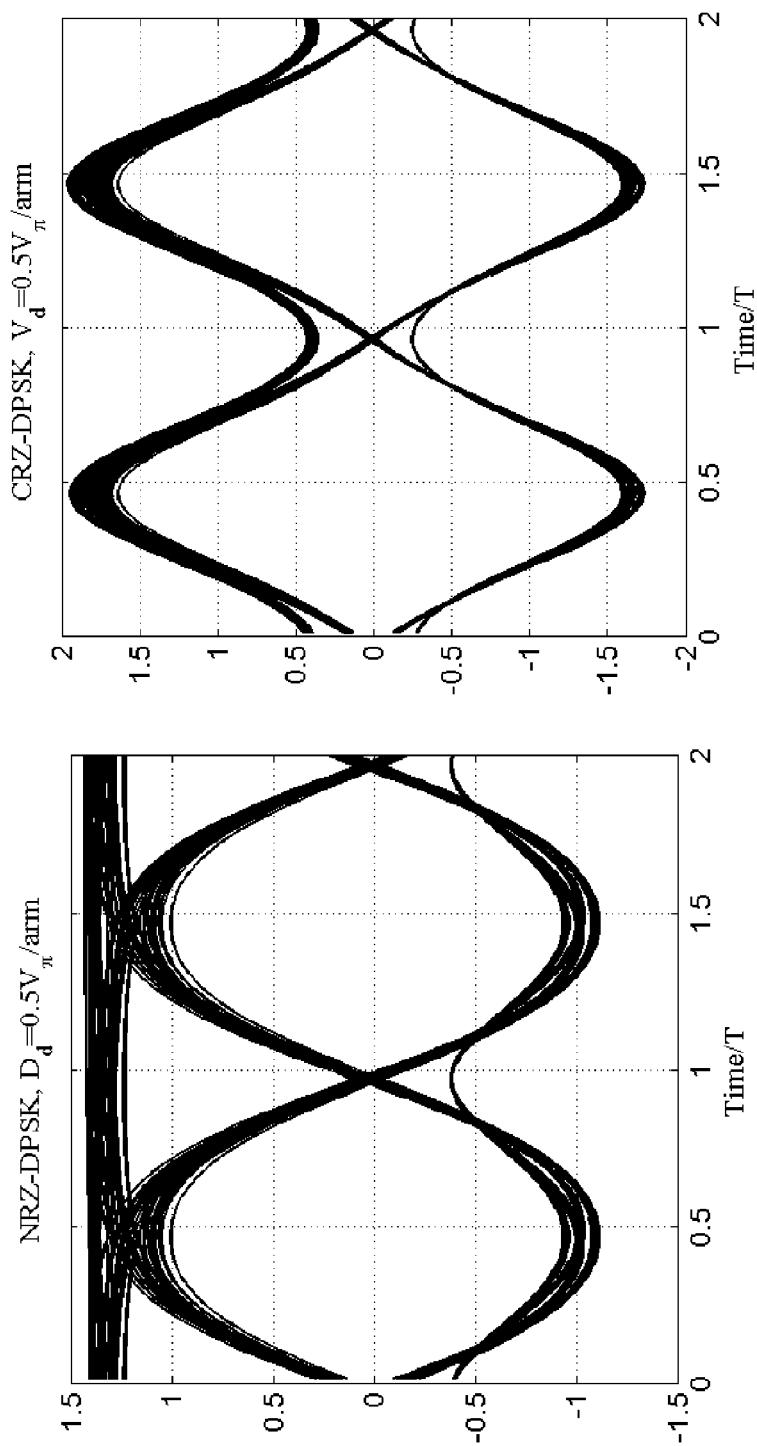
FIG. 11 is the simulated eye diagrams after balanced detection of a conventional NRZ-DPSK back-to-back transmission, and a CRZ-DPSK back-to-back transmission in accordance with an embodiment of the present invention.

Further, CRZ-DPSK signal generation according to the present invention outperforms conventional transmitters with regard to MZM bandwidth limitation-induced amplitude fluctuation when the MZM is not fully driven. FIGS. 11 a-b respectively show the simulated electrical eye diagrams (after balanced detection, assuming the modulator has a limited bandwidth as shown in FIG. 9 and is not fully driven ($V_d=0.5V_\pi$/arm)), of a conventional NRZ-DPSK back-to-back transmission, and a CRZ-DPSK back-to-back transmission in accordance with an embodiment of the invention. It can be understood from FIGS. 11 a-b, that there is larger amplitude fluctuation in the NRZ-DPSK eye than in the CRZ-DPSK eye obtained using a transmitter according to the present invention.

Figure 12:
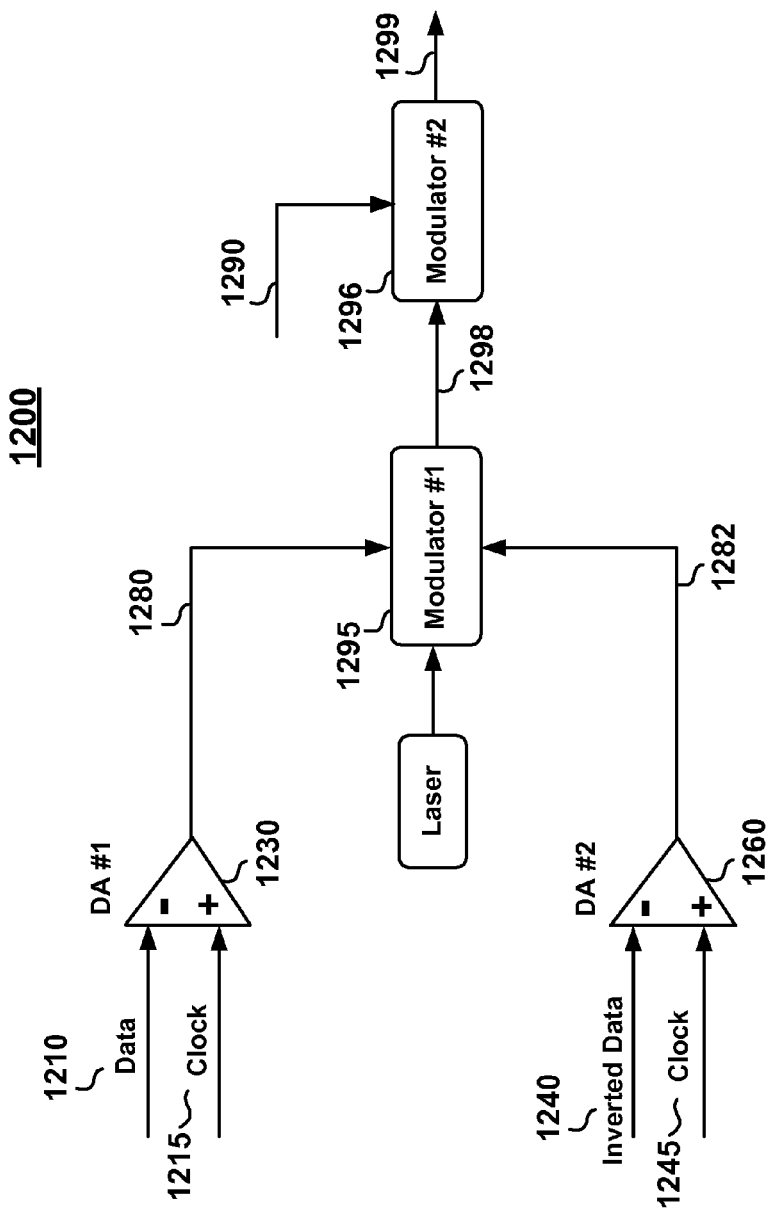
FIG. 12 is a diagram depicting an apparatus for generating CRZ-DQPSK optical signals according to an embodiment of the present invention.

It will be appreciated by those skilled in the art that the present invention may be extended to generate CRZ differential-quadrature-phase-shift-keyed (DQPSK) optical signals. In one embodiment of an apparatus for generating CRZ-DQPSK optical signals 1200 shown in FIG. 12, a first modulator 1295 (Modulator #1) is cascaded with a second modulator 1296 (Modulator #2). The first modulator 1295 is arranged and driven in a similar manner as the modulator 195 of FIG. 1 using a pair of logically complementary RZ drive signals 1280 and 1282 to generate a CRZ-DPSK optical signal 1298. The RZ drive signals 1280, 1282 are generated by differentially amplifying a differentially encoded first data tributary 1210 (i.e. a first portion of a data signal to be transmitted on the CRZ-DQPSK optical signal 1299) with a first clock signal 1215, and differentially amplifying an inverse of the first data tributary 1210 (inverted data signal 1240) and a second clock signals 1245, respectively.

The second modulator 1296 is a phase modulator and is driven using an NRZ drive signal 1290 generated based on a differentially encoded second data tributary (i.e. a second portion of the data signal to be transmitted on the CRZ-DQPSK optical signal 1299). The second modulator 1296 is driven by the NRZ drive signal 1290 at BR/2 to produce a phase shift of 0 or $\pi/2$ in the CRZ-DPSK optical signal 1298 from the first modulator 1295, thus encoding the information of the second data tributary on the CRZ-DPSK optical signal 1298, generating the CRZ-DQPSK optical signal 1299.

As discussed above with reference to the embodiment of FIG. 1, the data tributary 1210 contains differentially encoded data and has the same data rate as the clock signal 1215. The differential amplifiers DA #1 1230, DA #2 1260 shown in FIG. 12 logically combine the differentially encoded data and the clock signals by a logic AND operation, and can be replaced by logic AND gates (not shown). Retiming circuits (not shown) may be employed to synchronize the signals used and generated by the CRZ-DQPSK transmitter apparatus 1200. The first modulator 1295 is preferably a dual drive z-cut $LiNbO_3$ Mach-Zehnder modulator.

In an alternative embodiment of an apparatus for generating CRZ-DQPSK optical signals 1300, shown in FIG. 13, a nested modulator configuration is used wherein the outputs from a first modulator 1395 and a second modulator 1396 are combined to generate a CRZ-DQPSK optical signal 1398.

As can be readily understood by those skilled in the art from FIG. 13 and the above discussion of the embodiments of FIG. 1, the first modulator 1395 is driven using a first pair of logically complementary RZ drive signals 1380 and 1382 in essentially the same manner as the modulator 195 of FIG. 1 to generate a first CRZ-DPSK optical signal 1350. The first pair of RZ drive signals 1380, 1382 are respectively generated using a first data tributary (i.e. a first portion of a data signal to be transmitted on the CRZ-DQPSK optical signal 1398) and its inverse.

The second modulator 1396 is also driven in essentially the same manner as the modulator 195 of FIG. 1, using a second pair of logically complementary RZ drive signals 1385 and 1386 to generate a second CRZ-DPSK optical signal 1351. The second pair of RZ drive signals 1385, 1386 are respectively generated based on a second data tributary (i.e. a second portion of a data signal to be transmitted on the CRZ-DQPSK optical signal 1398) and its inverse. The second CRZ-DPSK optical signal 1351 is phase shifted by $\pi/2$ using a phase shifter 1310 before being combined with the first CRZ-DPSK optical signal 1350 to generate the CRZ-DQPSK optical signal 1398. Those skilled in the art will appreciate that the first CRZ-DPSK optical signal 1350 and the second CRZ-DPSK optical signal 1351 are combined interferometrically to generated the CRZ-DQPSK optical signal 1398.

Inset in FIG. 13 are constellation diagrams 1320, 1321 and 1322 for the first CRZ-DPSK drive signal 1350, the second CRZ-DPSK drive signal 1351 after being phase shifted by $\pi/2$, and the CRZ-DQPSK optical signal 1398, respectively. The optical intensity profile for the CRZ-DQPSK optical signal 1398 is also shown in the inset plot 1325.

As discussed above with reference to the embodiment of FIG. 1, retiming circuits may be employed to synchronize the signals used and generated by the CRZ-DQPSK transmitter apparatus 1300. The first and second modulators 1395 and 1396 are preferably dual drive z-cut $LiNbO_3$ Mach-Zehnder modulators.

Although the invention has been described with reference to illustrative embodiments, this description should not be construed in a limiting sense. Various modifications of the described embodiments, as well as other embodiments of the invention, which are apparent to persons skilled in the art to which the invention pertains, are deemed to lie within the principle and scope of the invention as expressed in the following claims.

We claim:

1. An apparatus for generating a chirped return-to-zero (CRZ) differential quadrature-phase-shift-keyed (DQPSK) optical signal comprising:
    means for generating a first return-to-zero (RZ) drive signal and a second RZ drive signal using a first tributary of a data signal;

modulator means driven by the first and second RZ drive signals for providing simultaneous RZ pulse formatting and chirped DPSK data modulation to an optical signal to generate a CRZ-DPSK optical signal;

means for generating a non-return-to-zero (NRZ) drive signal based on a second tributary of the data signal;

modulator means driven by the NRZ drive signal for receiving the CRZ-DPSK optical signal and phase shifting the CRZ-DPSK signal by 0 or $\pi/2$ to generate the CRZ-DQPSK optical signal.

2. An apparatus for generating a chirped return-to-zero (CRZ) differential quadrature-phase-shift-keyed (DQPSK) optical signal comprising:

means for generating a first pair of return-to-zero (RZ) drive signals using a first tributary of the data signal;

means for generating a second pair of RZ drive signals using a second tributary of the data signal;

modulator means driven by the first pair of RZ drive signals for providing simultaneous RZ pulse formatting and chirped DPSK data modulation to an optical signal to generate a first CRZ-DPSK optical signal;

modulator means driven by the second pair of RZ drive signals for providing simultaneous RZ pulse formatting and chirped DPSK data modulation to an optical signal to generate a second CRZ-DPSK optical signal;

means phase shifting the second CRZ-DPSK optical signal by $\pi/2$; and means for combining the first CRZ-DPSK optical signal and the phase shifted second CRZ-DPSK optical signal to generate the CRZ-DQPSK optical signal.

* * * * *